(12) United States Patent
Luo et al.

(10) Patent No.: US 10,701,738 B2
(45) Date of Patent: Jun. 30, 2020

(54) DATA TRANSMISSION METHOD, USER EQUIPMENT, AND BASE STATION

(71) Applicant: HUAWEI TECHNOLOGIES CO., LTD., Shenzhen, Guangdong (CN)

(72) Inventors: Haiyan Luo, Shanghai (CN); Tianle Deng, Shanghai (CN); Yuanyuan Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 15/264,523

(22) Filed: Sep. 13, 2016

(65) Prior Publication Data
US 2017/0006634 A1    Jan. 5, 2017

Related U.S. Application Data

(63) Continuation of application No. PCT/CN2014/073470, filed on Mar. 14, 2014.

(51) Int. Cl.
*H04W 74/08* (2009.01)
*H04W 72/12* (2009.01)
*H04W 84/12* (2009.01)

(52) U.S. Cl.
CPC ..... *H04W 74/085* (2013.01); *H04W 72/1289* (2013.01); *H04W 84/12* (2013.01)

(58) Field of Classification Search
CPC ... H04W 84/12; H04W 72/085; H04W 24/10; H04W 36/30; H04B 17/318
See application file for complete search history.

(56) References Cited

U.S. PATENT DOCUMENTS

2011/0243111 A1    10/2011 Andgart et al.
2013/0272269 A1*   10/2013 Srivastava ............ H04W 36/30
                                                    370/332
(Continued)

FOREIGN PATENT DOCUMENTS

CN    101409708 A    4/2009
CN    101494848 A    7/2009
(Continued)

OTHER PUBLICATIONS

International Search Report in corresponding to CN 2014073470 dated Dec. 17, 2014.
(Continued)

*Primary Examiner* — Jung H Park
(74) *Attorney, Agent, or Firm* — Kilpatrick Townsend & Stockton LLP

(57) ABSTRACT

Embodiments of the present invention provide a data transmission method, user equipment, and a base station. The method can include receiving, by user equipment, indication information for stopping transmission sent by a base station, where the indication information for stopping transmission is configured to instruct the user equipment to stop transmitting uplink data for at least one service by through an access point AP of a wireless local area network WLAN. The method can also include stopping, by the user equipment according to the indication information for stopping transmission, transmitting the uplink data for the at least one service through the AP. In this process, the user equipment reduces a data volume of uplink data transmitted through the WLAN, so as to decrease a probability that an uplink data collision occurs in the WLAN, thereby improving service quality.

13 Claims, 5 Drawing Sheets

---

A base station determines whether information about a threshold for stopping transmission needs to be sent to user equipment — 401

↓

Send the information about a threshold for stopping transmission to the user equipment if the base station determines that the information about a threshold for stopping transmission needs to be sent to the user equipment, so that the user equipment determines, according to the information about a threshold for stopping transmission, whether transmission of uplink data of at least one service by using an access point AP of a wireless local area network WLAN needs to be stopped — 402

(56) References Cited

U.S. PATENT DOCUMENTS

| | | |
|---|---|---|
| 2013/0343336 A1 | 12/2013 | Bai |
| 2015/0098383 A1 | 4/2015 | Ding et al. |
| 2015/0208277 A1* | 7/2015 | De Pasquale ........... H04L 47/11 370/230.1 |
| 2016/0353498 A1* | 12/2016 | Enomoto .............. H04W 60/04 |
| 2017/0164419 A1* | 6/2017 | Kim .................... H04W 76/028 |

FOREIGN PATENT DOCUMENTS

| | | |
|---|---|---|
| CN | 102612067 A | 7/2012 |
| CN | 102655676 A | 9/2012 |
| CN | 103299569 A | 9/2013 |
| CN | 103428641 A | 12/2013 |
| EP | 2367381 A1 | 9/2011 |
| EP | 2922336 A1 | 9/2015 |
| WO | 2014019214 A1 | 2/2014 |

OTHER PUBLICATIONS

International Search Report dated Dec. 17, 2014, in International Application No. PCT/CN2014/073470.

* cited by examiner

DATA TRANSMISSION METHOD, USER EQUIPMENT, AND BASE STATION

CROSS-REFERENCE TO RELATED APPLICATIONS

This application is a continuation of International Application No. PCT/CN2014/073470, filed on Mar. 14, 2014, which is hereby incorporated by reference in its entirety

TECHNICAL FIELD

The present application relates to communications technologies, and in particular, to a data transmission method, user equipment, and a base station.

BACKGROUND

At present, collaboration between a 3rd Generation Partnership Project (3GPP) network and a non-3rd Generation Partnership Project network becomes a focus of current research. For example, collaboration between a cellular network and a wireless local area network (WLAN) network enables user equipment (UE) to perform, at the same time when working in an LTE network, a service by accessing the WLAN network through a wireless local area network access point (WLAN AP). For example, the cellular network is a network whose standard is Long Term Evolution (LTE), Global System for Mobile Communications (GSM), Code Division Multiple Access (CDMA), or the like.

In the prior art, a WLAN AP obtains, in a WLAN network by contending, a resource for transmitting downlink data, and UE obtains, in a WLAN network and by contending, a resource for transmitting uplink data. In an example, UE sends uplink data (including an uplink data frame and/or an uplink management frame), and a contention process is: when sensing that a channel is in an idle state, the UE first waits for an inter frame spacing (IFS), then selects a random backoff time from zero to a contention window (CW) to avoid a collision, and starts a timer at the same time when selecting the random backoff time; or if a channel is in a busy state, the UE waits. In the idle state, when a timing time of the timer progressively reduces to zero, the UE starts to transmit the uplink data if the channel is still in the idle state. In this process, a collision may occur if multiple UEs select a same random backoff time. After the collision occurs, the UE continues to contend for a resource after doubling the CW (the CW is increased at most to a maximum value of the CW). A data loss occurs when a quantity of retry times exceeds a maximum quantity of times allowed. If many UEs send uplink data, multiple UEs select a same random backoff time because of backoff time selection randomness, causing a large increase in a probability that an uplink data collision occurs. Consequently, service quality cannot be ensured.

SUMMARY

Embodiments of the present invention provide a data transmission method, user equipment, and a base station, where a probability that an uplink data collision occurs in a WLAN network is decreased to improve a system capacity of the WLAN network, so as to ensure service quality.

According to a first aspect, an embodiment of the present invention provides an uplink data transmission method. The method includes receiving, by user equipment, indication information for stopping transmission sent by a base station, where the indication information for stopping transmission is configured to instruct the user equipment to stop transmitting uplink data for at least one service by through an access point AP of a wireless local area network WLAN. The method also includes stopping, by the user equipment according to the indication information for stopping transmission, transmitting the uplink data for the at least one service through the AP.

In a first possible implementation manner of the first aspect, after the receiving, by user equipment, indication information for stopping transmission sent by a base station, the method further includes receiving, by the user equipment, indication information for permitting transmission sent by the base station, where the indication information for permitting transmission is configured to instruct the user equipment to transmit the uplink data for the at least one service through the AP. The method also includes transmitting, by the user equipment according to the indication information for permitting transmission, the uplink data for the at least one service through the AP.

With reference to the first aspect or the first possible implementation manner of the first aspect, in a second possible implementation manner of the first aspect, the indication information for stopping transmission includes service identifier information, where the service identifier information is configured to indicate the at least one service. In the second possible implementation manner, the stopping, by the user equipment according to the indication information for stopping transmission, transmitting the uplink data for the at least one service through the AP includes stopping, by the user equipment according to the indication information for stopping transmission, transmitting, through the AP, the uplink data for the at least one service indicated by the service identifier information.

With reference to the first possible implementation manner of the first aspect, in a third possible implementation manner of the first aspect, the indication information for permitting transmission includes service identifier information, where the service identifier information is configured to indicate the at least one service. In the third possible implementation manner, the receiving, by the user equipment, indication information for permitting transmission sent by the base station includes receiving, by the user equipment, the indication information for permitting transmission that includes the service identifier information and that is sent by the base station. Also in the third possible implementation manner, the transmitting, by the user equipment according to the indication information for permitting transmission, the uplink data for the at least one service through the AP includes: transmitting, by the user equipment through the AP and according to the indication information for permitting transmission, the uplink data for the at least one service indicated by the service identifier information.

With reference to the first aspect, or the first, the second, or the third possible implementation manner of the first aspect, in a fourth possible implementation manner of the first aspect, after the receiving, by user equipment, indication information for stopping transmission sent by a base station, the method further includes transmitting, by the user equipment, the uplink data for the at least one service through a cellular network.

According to a second aspect, an embodiment of the present invention provides an uplink data transmission method, including determining, by a base station, whether user equipment is to stop transmitting uplink data for at least one service through an AP of a wireless local area network WLAN. The method also includes sending indication information for stopping transmission to the user equipment if the base station determines that the user equipment is to stop transmitting the uplink data for the at least one service through the AP, where the indication information for stopping transmission is configured to instruct the user equipment to stop transmitting the uplink data for the at least one service through the AP.

In a first possible implementation manner of the second aspect, after the sending, by the base station, indication information for stopping transmission to the user equipment, the method further includes determining, by the base station, whether the user equipment is to transmit the uplink data for the at least one service through the AP; and sending indication information for permitting transmission to the user equipment if the base station determines that the user equipment is to transmit the uplink data for the at least one service through the AP, where the indication information for permitting transmission is configured to instruct the user equipment to transmit the uplink data for the at least one service through the AP.

With reference to the second aspect or the first possible implementation manner of the second aspect, in a second possible implementation manner of the second aspect, the indication information for stopping transmission includes service identifier information, where the service identifier information is configured to indicate the at least one service.

With reference to the first possible implementation manner of the second aspect, in a third possible implementation manner of the second aspect, the indication information for permitting transmission includes service identifier information, where the service identifier information is configured to indicate the at least one service.

With reference to the second aspect, or the first, the second, or the third possible implementation manner of the second aspect, in a fourth possible implementation manner of the second aspect, after the sending indication information for stopping transmission to the user equipment if the base station determines that the user equipment is to stop transmitting the uplink data for the at least one service through the AP, the method further includes receiving, by the base station, the uplink data for the at least one service transmitted by the user equipment.

According to a third aspect, an embodiment of the present invention provides an uplink data transmission method, including: receiving, by user equipment, information about a threshold for stopping transmission sent by a base station; determining, by the user equipment according to the information about a threshold for stopping transmission, whether transmission of uplink data of at least one service by through an access point AP of a wireless local area network WLAN is to be stopped; and when the user equipment determines that the transmission of the uplink data for the at least one service through the AP is to be stopped, stopping transmitting the uplink data for the at least one service through the AP.

In a first possible implementation manner of the third aspect, after the stopping, by the user equipment, transmitting the uplink data for the at least one service through the AP, the method further includes: receiving, by the user equipment, information about a threshold for permitting transmission sent by the base station; determining, by the user equipment according to the information about a threshold for permitting transmission, whether the uplink data for the at least one service is to be transmitted through the AP; and when the user equipment determines that the uplink data for the at least one service is to be transmitted through the AP, transmitting the uplink data for the at least one service through the AP.

With reference to the third aspect or the first possible implementation manner of the third aspect, in a second possible implementation manner of the third aspect, the information about a threshold for stopping transmission includes service identifier information, where the service identifier information is configured to indicate the at least one service.

With reference to the first possible implementation manner of the third aspect, in a third possible implementation manner of the third aspect, the information about a threshold for permitting transmission includes service identifier information, where the service identifier information is configured to indicate the at least one service.

With reference to the third aspect, or the first, the second, or the third possible implementation manner of the third aspect, in a fourth possible implementation manner of the third aspect, when the user equipment determines that the transmission of the uplink data for the at least one service through the AP is to be stopped, after the stopping transmitting the uplink data for the at least one service through the AP, the method further includes transmitting, by the user equipment, the uplink data for the at least one service through a cellular network.

According to a fourth aspect, an embodiment of the present invention provides an uplink data transmission method, including determining, by a base station, whether information about a threshold for stopping transmission is to be sent to user equipment; and sending the information about a threshold for stopping transmission to the user equipment when the base station determines that the information about a threshold for stopping transmission is to be sent to the user equipment, so that the user equipment determines, according to the information about a threshold for stopping transmission, whether transmission of uplink data of at least one service by through an access point AP of a wireless local area network WLAN is to be stopped.

In a first possible implementation manner of the fourth aspect, after the sending the information about a threshold for stopping transmission to the user equipment when the base station determines that the information about a threshold for stopping transmission is to be sent to the user equipment, the method further includes sending, by the base station, information about a threshold for permitting transmission to the user equipment.

With reference to the fourth aspect or the first possible implementation manner of the fourth aspect, in a second possible implementation manner of the fourth aspect, the information about a threshold for stopping transmission includes service identifier information, where the service identifier information is configured to indicate the at least one service.

With reference to the first possible implementation manner of the fourth aspect, in a third possible implementation manner of the fourth aspect, the information about a threshold for permitting transmission includes service identifier information, where the service identifier information is configured to indicate the at least one service.

With reference to the fourth aspect, or the first, the second, or the third possible implementation manner of the fourth aspect, in a fourth possible implementation manner of the fourth aspect, after the sending the information about a threshold for stopping transmission to the user equipment when the base station determines that the information about a threshold for stopping transmission is to be sent to the user equipment, the method further includes: receiving, by the base station, the uplink data for the at least one service transmitted by the user equipment.

According to a fifth aspect, an embodiment of the present invention provides user equipment, including: a receiving module, and a stop module. The receiving module, in that embodiment, is configured to receive indication information for stopping transmission sent by a base station, where the indication information for stopping transmission is configured to instruct the user equipment to stop transmitting uplink data for at least one service by through an access point AP of a wireless local area network WLAN. The stop module, in that embodiment, is configured to stop, according to the indication information for stopping transmission received by the receiving module, transmission of the uplink data for the at least one service through the AP.

In a first possible implementation manner of the fifth aspect, the user equipment further includes a transmission module. In that implementation manner, the receiving module is further configured to: after receiving the indication information for stopping transmission sent by the base station, receive indication information for permitting transmission sent by the base station, where the indication information for permitting transmission is configured to instruct the user equipment to transmit the uplink data for the at least one service through the AP. Also in that implementation manner, the transmission module is configured to transmit, according to the indication information for permitting transmission received by the receiving module, the uplink data for the at least one service through the AP.

With reference to the fifth aspect or the first possible implementation manner of the fifth aspect, in a second possible implementation manner of the fifth aspect, the indication information for stopping transmission includes service identifier information, where the service identifier information is configured to indicate the at least one service. The stop module is specifically configured to stop, according to the indication information for stopping transmission, the transmission, through the AP, of the uplink data for the at least one service indicated by the service identifier information.

With reference to the first possible implementation manner of the fifth aspect, in a third possible implementation manner of the fifth aspect, the indication information for permitting transmission includes service identifier information, where the service identifier information is configured to indicate the at least one service. In that implementation manner, the receiving module is configured to receive the indication information for permitting transmission that includes the service identifier information and that is sent by the base station; and the transmission module is configured to transmit, through the AP and according to the indication information for permitting transmission received by the receiving module, the uplink data for the at least one service indicated by the service identifier information.

With reference to the fifth aspect, or the first, the second, or the third possible implementation manner of the fifth aspect, in a fourth possible implementation manner of the fifth aspect, the transmission module is further configured to transmit the uplink data for the at least one service through a cellular network.

According to a sixth aspect, an embodiment of the present invention provides a base station, including a determining module and a sending module. The determination module is configured to determine whether user equipment is to stop transmitting uplink data for at least one service through an AP of a wireless local area network WLAN. In that embodiment, the sending module is configured to send indication information for stopping transmission to the user equipment when the determining module determines that the user equipment is to stop transmitting the uplink data for the at least one service through the AP, where the indication information for stopping transmission is configured to instruct the user equipment to stop transmitting the uplink data for the at least one service through the AP.

In a first possible implementation manner of the sixth aspect, the determining module is further configured to: after the sending module sends the indication information for stopping transmission to the user equipment, determine whether the user equipment is to transmit the uplink data for the at least one service through the AP. The sending module is further configured to send indication information for permitting transmission to the user equipment when the base station determines that the user equipment is to transmit the uplink data for the at least one service through the AP, where the indication information for permitting transmission is configured to instruct the user equipment to transmit the uplink data for the at least one service through the AP.

With reference to the sixth aspect or the first possible implementation manner of the sixth aspect, in a second possible implementation manner of the sixth aspect, the indication information for stopping transmission includes service identifier information, where the service identifier information is configured to indicate the at least one service.

With reference to the first possible implementation manner of the sixth aspect, in a third possible implementation manner of the sixth aspect, the indication information for permitting transmission includes service identifier information, where the service identifier information is configured to indicate the at least one service.

With reference to the sixth aspect, or the first, the second, or the third possible implementation manner of the sixth aspect, in a fourth possible implementation manner of the sixth aspect, the base station further includes a receiving module configured to: after the sending module sends the indication information for stopping transmission, receive the uplink data for the at least one service transmitted by the user equipment.

According to a seventh aspect, an embodiment of the present invention provides user equipment, including a receiving module, a determining module, and a strop module. In that embodiment, the receiving module is configured to receive information about a threshold for stopping transmission sent by a base station. In that embodiment, the determining module is configured to determine, according to the information about a threshold for stopping transmission received by the receiving module, whether transmission of uplink data of at least one service by through an access point AP of a wireless local area network WLAN is to be stopped. In that embodiment, the stop module is configured to: when the determining module determines that the transmission of the uplink data for the at least one service through the AP is to be stopped, stop transmitting the uplink data for the at least one service through the AP.

In a first possible implementation manner of the seventh aspect, the user equipment further includes: a transmission module. In that implementation manner, the receiving module is further configured to: after the stop module stops transmitting the uplink data for the at least one service through the AP, receive information about a threshold for permitting transmission sent by the base station. Also in that implementation manner, the determining module is further configured to determine, according to the information about a threshold for permitting transmission received by the receiving module, whether the uplink data for the at least one service is to be transmitted through the AP. Still in that implementation manner, the transmission module is configured to: when the determining module determines that the uplink data for the at least one service is to be transmitted through the AP, transmit the uplink data for the at least one service through the AP.

With reference to the seventh aspect or the first possible implementation manner of the seventh aspect, in a second possible implementation manner of the seventh aspect, the information about a threshold for stopping transmission includes service identifier information, where the service identifier information is configured to indicate the at least one service.

With reference to the first possible implementation manner of the seventh aspect, in a third possible implementation manner of the seventh aspect, the information about a threshold for permitting transmission includes service identifier information, where the service identifier information is configured to indicate the at least one service.

With reference to the seventh aspect, or the first, the second, or the third possible implementation manner of the seventh aspect, in a fourth possible implementation manner of the seventh aspect, the transmission module is further configured to: after the stop module stops transmitting the uplink data for the at least one service through the AP, transmit the uplink data for the at least one service through a cellular network.

According to an eighth aspect, an embodiment of the present invention provides a base station, including a determination module, and a sending module. In that embodiment, the determining module is configured to determine whether information about a threshold for stopping transmission is to be sent to user equipment. In that embodiment, the sending module is configured to send the information about a threshold for stopping transmission to the user equipment when the determining module determines that the information about a threshold for stopping transmission is to be sent to the user equipment, so that the user equipment determines, according to the information about a threshold for stopping transmission, whether transmission of uplink data of at least one service by through an access point AP of a wireless local area network WLAN is to be stopped.

In a first possible implementation manner of the eighth aspect, the sending module is further configured to send information about a threshold for permitting transmission to the user equipment after sending the information about a threshold for stopping transmission.

With reference to the eighth aspect or the first possible implementation manner of the eighth aspect, in a second possible implementation manner of the eighth aspect, the information about a threshold for stopping transmission includes service identifier information, where the service identifier information is configured to indicate the at least one service.

With reference to the first possible implementation manner of the eighth aspect, in a third possible implementation manner of the eighth aspect, the information about a threshold for permitting transmission includes service identifier information, where the service identifier information is configured to indicate the at least one service.

With reference to the eighth aspect, or the first, the second, or the third possible implementation manner of the eighth aspect, in a fourth possible implementation manner of the eighth aspect, the base station further includes a receiving module, configured to: after the sending module sends the information about a threshold for stopping transmission to the user equipment, receive the uplink data for the at least one service transmitted by the user equipment.

According to a ninth aspect, an embodiment of the present invention provides user equipment, including a processor and a memory, where the memory stores an execution instruction, the processor communicates with the memory when the user equipment runs, and the processor executes the execution instruction to enable the user equipment to execute the foregoing method according to the first aspect or any one of the first to the fourth possible implementation manners of the first aspect.

According to a tenth aspect, an embodiment of the present invention provides a base station, including a processor and a memory, where the memory stores an execution instruction, the processor communicates with the memory when the base station runs, and the processor executes the execution instruction to enable the base station to execute the foregoing method according to the second aspect or any one of the first to the fourth possible implementation manners of the second aspect.

According to an eleventh aspect, an embodiment of the present invention provides user equipment, including a processor and a memory, where the memory stores an execution instruction, the processor communicates with the memory when the user equipment runs, and the processor executes the execution instruction to enable the user equipment to execute the foregoing method according to the third aspect or any one of the first to the fourth possible implementation manners of the third aspect.

According to a twelfth aspect, an embodiment of the present invention provides a base station, including a processor and a memory, where the memory stores an execution instruction, the processor communicates with the memory when the base station runs, and the processor executes the execution instruction to enable the base station to execute the foregoing method according to the fourth aspect or any one of the first to the fourth possible implementation manners of the fourth aspect.

According to the data transmission method, the user equipment, and the base station that are provided by the embodiments of the present invention, after receiving indication information for stopping transmission sent by a base station, user equipment stops transmitting uplink data for at least one service through an AP, so that uplink data that is to be transmitted through a WLAN is reduced. In this process, the user equipment reduces a data volume of uplink data transmitted through the WLAN, so as to decrease a probability that an uplink data collision occurs in the WLAN, thereby improving service quality.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
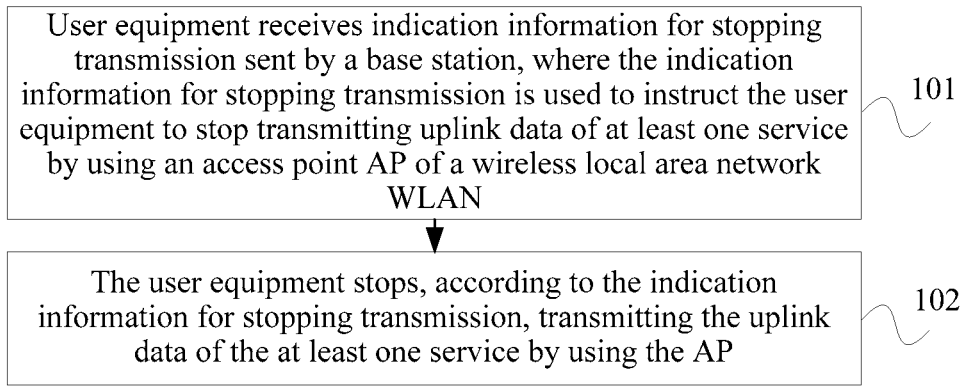
FIG. 1 is a flowchart of Embodiment 1 of a data transmission method according to the present invention.

FIG. 1 is a flowchart of Embodiment 1 of a data transmission method according to the present invention. This embodiment of the present invention describes the present invention in detail from a perspective of user equipment, and this embodiment of the present invention is applicable to a scenario in which a cellular network and a WLAN network converge with each other and uplink data in the WLAN is reduced to decrease a probability that an uplink data collision occurs in the WLAN. Specifically, this embodiment includes the following steps:

101. User equipment receives indication information for stopping transmission sent by a base station, where the indication information for stopping transmission is configured to instruct the user equipment to stop transmitting uplink data for at least one service by through an access point AP of a wireless local area network WLAN.

Generally, a wireless communications system includes a base station that provides a cellular network, an access point that provides a wireless local area network, and user equipment. The user equipment transmits uplink data to a core network through the cellular network and the WLAN, and receives downlink data from the core network through the cellular network and the WLAN. In this embodiment, the user equipment receives the indication information for stopping transmission that is sent by the base station and used to instruct to stop transmitting the uplink data in the WLAN. In this process, the indication information for stopping transmission may be sent to the user equipment after the base station determines that the user equipment stops transmitting the uplink data through the AP, or may be forwarded to the user equipment after the base station receives the indication information for stopping transmission sent by an access network discovery and selection function (ANDSF) server.

102. The user equipment stops, according to the indication information for stopping transmission, transmitting the uplink data for the at least one service through the AP.

If the user equipment receives the indication information for stopping transmission sent by the base station, the user equipment stops transmitting the uplink data for the at least one service through the AP. For example, the user equipment may stop sending, to the AP, the uplink data of the service originally transmitted through the AP; or stop, according to a preset rule, sending some of the uplink data of the service originally transmitted through the AP.

In the uplink data transmission method provided by this embodiment of the present invention, after receiving indication information for stopping transmission sent by a base station, user equipment stops transmitting uplink data for at least one service through an AP, so that uplink data that is to be transmitted through a WLAN is reduced. In this process, the user equipment reduces a data volume of uplink data transmitted through the WLAN, so as to decrease a probability that an uplink data collision occurs in the WLAN, thereby improving service quality.

Optionally, in the foregoing Embodiment 1, after receiving the indication information for stopping transmission sent by the base station, the user equipment further receives indication information for permitting transmission sent by the base station, where the indication information for permitting transmission is configured to instruct the user equipment to transmit the uplink data for the at least one service through the AP. Then, the user equipment transmits, according to the indication information for permitting transmission, the uplink data for the at least one service through the AP.

Further and optionally, the indication information for permitting transmission may include service identifier information, where the service identifier information is configured to indicate the at least one service. In this case, the user equipment receives the indication information for permitting transmission that includes the service identifier information and that is sent by the base station, and transmits, through the AP and according to the indication information for permitting transmission, the uplink data for the at least one service indicated by the service identifier information.

Specifically, the service may be divided into a UE granularity, an access point name (APN) granularity, a bearer granularity, an Internet Protocol (IP) flow granularity, and the like according to different granularities. The UE granularity represents uplink data transmitted by one user equipment; the APN granularity represents uplink data transmitted by the UE by through an access point; the bearer granularity represents uplink data of a set of IP flows of the UE with similar characteristics, for example, uplink data transmitted through a same packet data network (PDN) connection, uplink data with a same QoS class identifier (QCI), or uplink data with a same Address Resolution Protocol (ARP); the IP flow granularity represents an IP flow corresponding to the UE according to a filter characteristic, and the IP flow may be identified through a deep packet inspection (DPI) technology. In this embodiment, the service identifier information corresponds to a different identifier at a different service granularity. For example, the UE granularity corresponds to a UE identifier, the APN granularity corresponds to an access point identifier, the bearer granularity corresponds to a bearer identifier, and the IP flow granularity corresponds to an IP flow identifier. The user equipment determines, according to the service identifier information, whether to transmit, through the AP, the uplink data for the at least one service indicated by the service identifier information. For example, when indication information for permitting transmission is transmitted in a broadcast manner and service identifier information is a UE identifier, user equipment indicated by the UE identifier may transmit all uplink data through an AP; or when indication information for permitting transmission is transmitted in a broadcast manner and service identifier information is an APN identifier, uplink data sent by each user equipment according to the APN identifier is all transmitted through an AP, uplink data of another APN identifier is not transmitted or transmitted through a cellular network. When indication information for permitting transmission is transmitted through radio resource control (RRC) signaling and service identifier information is a UE identifier, user equipment that receives the indication information for permitting transmission may transmit all uplink data through an AP; or when indication information for permitting transmission is transmitted through RRC signaling and service identifier information is a bearer identifier, uplink data sent through a bearer corresponding to the bearer identifier and by user equipment that receives the indication information for permitting transmission is all transmitted through an AP, and uplink data of another bearer identifier is not transmitted or transmitted through a cellular network.

Likewise, in the foregoing Embodiment 1, optionally, the indication information for stopping transmission may also carry service identifier information, where the service identifier information is configured to indicate the at least one service. In this case, the user equipment receives the indication information for stopping transmission that includes the service identifier information and that is sent by the base station, and stops, according to the indication information for stopping transmission, transmitting, through the AP, the uplink data for the at least one service indicated by the service type. In this case, the user equipment stops, according to the service identifier information, transmitting, through the AP, only uplink data corresponding to the service identifier information.

Optionally, in the foregoing Embodiment 1, after the user equipment receives the indication information for stopping transmission sent by the base station, the user equipment stops, according to the indication information for stopping transmission, sending the uplink data for the at least one service through the AP, and transmits the uplink data for the at least one service through a cellular network. That is, for the uplink data for the at least one service stopped from being transmitted through the AP, the user equipment may choose not to transmit the uplink data, or transmit the uplink data to a core network through the cellular network, and the present invention is not limited thereto.

Figure 2:
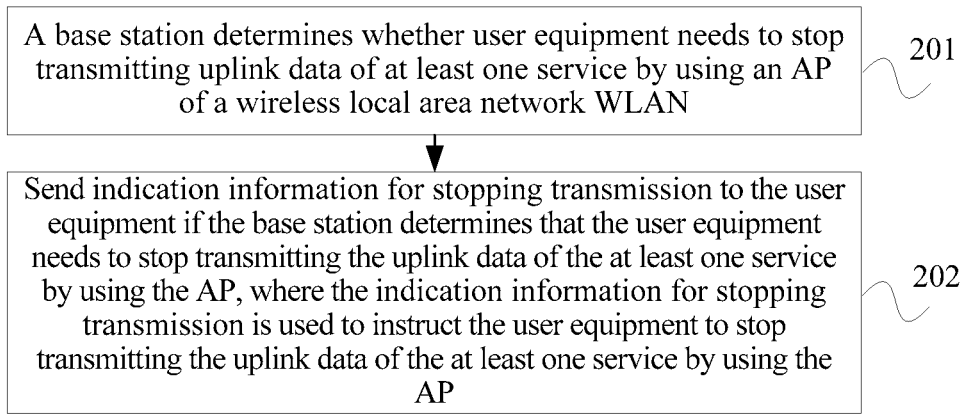
FIG. 2 is a flowchart of Embodiment 2 of a data transmission method according to the present invention.

FIG. 2 is a flowchart of Embodiment 2 of a data transmission method according to the present invention. This embodiment of the present invention describes the present invention in detail from a perspective of a base station, and this embodiment of the present invention is applicable to a scenario in which a cellular network and a WLAN network converge with each other and a data volume of uplink data in the WLAN is to be reduced to decrease a probability that an uplink data collision occurs in the WLAN. Specifically, this embodiment includes the following steps:

201. A base station determines whether user equipment is to stop transmitting uplink data for at least one service through an AP of a wireless local area network WLAN.

Generally, in a scenario in which a cellular network and a WLAN network converge with each other, a base station can provide a service for at least one user equipment. The base station stores status information, an importance level, a service importance degree, and the like of each user equipment, and a load status and the like of each AP. Therefore, the base station may determine, according to a performance condition of the AP, a performance condition of the UE, a performance condition of the base station, or the like, whether the user equipment is to stop transmitting the uplink data for the at least one service through the AP. For example, when uplink load of the base station is relatively light (for example, lighter than a preset threshold), indication information for stopping transmission may be sent to the user equipment, so that the UE stops transmitting the uplink data for the at least one service through the WLAN AP, and transmits the uplink data for the at least one service through the cellular network; or when load of the AP is relatively heavy, for example, when a proportion of busy channels sensed by the AP is relatively large (exceeds a threshold), the base station considers that a probability of a transmission collision in the AP may be significantly large, and therefore considers that uplink transmission in the AP is to be reduced to reduce the collision probability; therefore, all user equipment using the AP or some user equipment that has relatively more uplink data may be notified that transmission of the uplink data for the at least one service through the AP of the WLAN is to be stopped.

It should be noted that, the indication information for stopping transmission may be sent to the user equipment after the base station determines that the user equipment stops transmitting the uplink data through the AP, or may be forwarded to the user equipment after the base station receives the indication information for stopping transmission sent by an access network discovery and selection function ANDSF server, and the present invention is not limited thereto.

202. Send indication information for stopping transmission to the user equipment if the base station determines that the user equipment is to stop transmitting the uplink data for the at least one service through the AP, where the indication information for stopping transmission is configured to instruct the user equipment to stop transmitting the uplink data for the at least one service through the AP.

When determining that the user equipment is to stop transmitting the uplink data for the at least one service through the AP, the base station sends, to the user equipment, the indication information for stopping transmission, which is configured to instruct to stop transmitting the uplink data for the at least one service through the AP. For example, when load of an AP is relatively heavy, the base station determines that transmission of all or some services through the AP is to be stopped. In this case, the base station sends indication information for stopping transmission to corresponding user equipment.

In the uplink data transmission method provided by this embodiment of the present invention, when determining that user equipment is to stop transmitting uplink data for at least one service through an AP, a base station sends, to the user equipment, indication information for stopping transmission, which is configured to instruct to stop transmitting the uplink data for the at least one service through the AP, so that uplink data that is to be transmitted through a WLAN is reduced. In this process, a data volume of uplink data transmitted through the WLAN is reduced to decrease a probability that an uplink data collision occurs in the WLAN, thereby improving service quality.

Optionally, in the foregoing Embodiment 2, after sending the indication information for stopping transmission to the user equipment, the base station may further determine whether the user equipment is to transmit the uplink data for the at least one service through the AP. The base station sends the indication information for permitting transmission to the user equipment if the base station determines that the user equipment is to transmit the uplink data for the at least one service through the AP, where the indication information for permitting transmission is configured to instruct the user equipment to transmit the uplink data for the at least one service through the AP.

Optionally, in the foregoing Embodiment 2, the indication information for stopping transmission further includes service identifier information, where the service identifier information is configured to indicate the at least one service. In this case, the base station sends, to the user equipment, the indication information for stopping transmission that includes the service identifier information, so that the user equipment selectively stops, according to the service identifier information, transmitting uplink data of some services through the AP.

Optionally, in the foregoing Embodiment 2, the indication information for permitting transmission further includes service identifier information, where the service identifier information is configured to indicate the at least one service. In this case, the base station sends, to the user equipment, the indication information for permitting transmission that includes the service identifier information, so that the user equipment selectively transmits, according to the service identifier information, uplink data of some services through the AP.

Optionally, in the foregoing Embodiment 2, if the base station determines that the user equipment is to stop transmitting the uplink data for the at least one service through the AP, after sending the indication information for stopping transmission to the user equipment, the base station further receives the uplink data for the at least one service transmitted by the user equipment.

Figure 3:
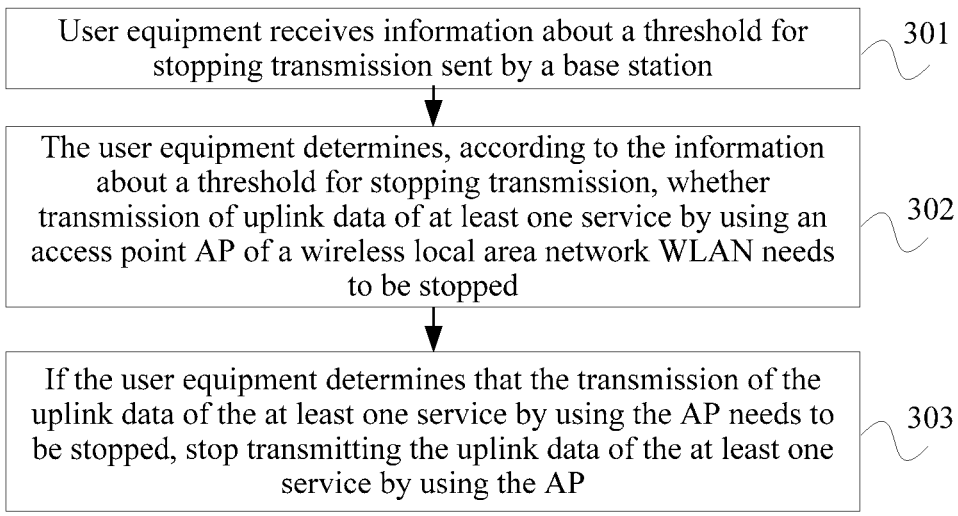
FIG. 3 is a flowchart of Embodiment 3 of a data transmission method according to the present invention.

FIG. 3 is a flowchart of Embodiment 3 of a data transmission method according to the present invention. This embodiment of the present invention describes the present invention in detail from a perspective of user equipment, and this embodiment of the present invention is applicable to a scenario in which a cellular network and a WLAN network converge with each other and a data volume of uplink data in the WLAN is to be reduced to decrease a probability that an uplink data collision occurs in the WLAN. Compared with the foregoing Embodiment 1 in which after receiving indication information for stopping transmission, user equipment passively stops transmitting uplink data for a service through an AP, in this embodiment, the user equipment receives information about a threshold for stopping transmission, and actively determines, according to the information about a threshold for stopping transmission, whether transmission of the uplink data through the AP is to be stopped. Specifically, this embodiment includes the following steps:

301. User equipment receives information about a threshold for stopping transmission sent by a base station.

In this step, the user equipment receives the information about a threshold for stopping transmission sent by the base station, where the information about a threshold for stopping transmission may be, for example, a performance condition of an AP, a performance condition of the UE, a performance condition of the base station. In this process, the information about a threshold for stopping transmission may be generated by the base station and sent to the user equipment, or may be forwarded to the user equipment after the base station receives the information about a threshold for stopping transmission sent by an ANDSF server.

302. The user equipment determines, according to the information about a threshold for stopping transmission, whether transmission of uplink data of at least one service by through an access point AP of a wireless local area network WLAN is to be stopped.

After receiving the information about a threshold for stopping transmission sent by the base station, the user equipment determines, according to the information about a threshold for stopping transmission, whether the transmission of the uplink data for the at least one service through the AP is to be stopped. For example, when the information about a threshold for stopping transmission is a performance condition threshold of the AP, if the user equipment determines that a current performance condition of the AP exceeds the performance condition threshold, the user equipment determines that the transmission of the uplink data for the at least one service through the AP is to be stopped. The at least one service may be specified in advance. For example, it may be specified in advance that when a current performance condition of the AP exceeds the performance condition threshold, UE corresponding to a UE identifier stops transmitting uplink data.

303. If the user equipment determines that the transmission of the uplink data for the at least one service through the AP is to be stopped, stop transmitting the uplink data for the at least one service through the AP.

When actively determining, according to the information about a threshold for stopping transmission, that the transmission of the uplink data for the at least one service through the AP is to be stopped, the user equipment actively stops transmitting the uplink data for the at least one service through the AP.

In the uplink data transmission method provided by this embodiment of the present invention, after receiving information about a threshold for stopping transmission sent by a base station, user equipment actively determines, according to the information about a threshold for stopping transmission, whether transmission of uplink data of at least one service through an AP is to be stopped. If the user equipment determines that the transmission of the uplink data for the at least one service through the AP is to be stopped, the user equipment stops transmitting the uplink data for the at least one service through the AP. In this process, the user equipment reduces a data volume of uplink data transmitted through a WLAN, so as to decrease a probability that an uplink data collision occurs in the WLAN, thereby improving service quality.

Optionally, in the foregoing Embodiment 3, for example, the information about a threshold for stopping transmission may be a transmission stop threshold of a performance condition of the user equipment, the AP, and/or the like when the user equipment is to stop transmitting the uplink data through the AP. In this case, if the user equipment determines that the performance condition of the user equipment and/or the AP and the transmission stop threshold meet a preset rule, the user equipment stops transmitting the uplink data through the AP; or if the user equipment determines that the performance condition of the user equipment and/or the AP and the transmission stop threshold do not meet a preset rule, the user equipment continues to transmit the uplink data through the AP.

Specifically, the AP periodically broadcasts a beacon frame (BF), where the beacon frame includes information such as a quantity of user equipment that currently accesses the AP, and a proportion of busy channels of the AP. When the transmission stop threshold is a maximum quantity of user equipment allowed to access the AP, the user equipment compares the quantity of user equipment in the beacon frame with the maximum quantity of user equipment allowed to access the AP. For an AP, if a quantity of user equipment that accesses the AP exceeds a maximum quantity, the user equipment stops sending the uplink data for the at least one service through the AP; or for an AP, if a quantity of user equipment that accesses the AP does not exceed a maximum quantity, the uplink data for the at least one service continues to be sent through the AP. For example, the maximum quantity of user equipment allowed to access the AP may be set to 10. If the quantity of user equipment that currently accesses the AP is greater than 10, it indicates that the AP is overloaded, and the user equipment is to stop sending the uplink data through the AP; or if the quantity of user equipment that accesses the AP is less than 10, the uplink data for the at least one service continues to be sent through the AP.

When the transmission stop threshold is a maximum proportion of busy channels of the AP, the user equipment compares the proportion of busy channels of the AP in the beacon frame with the maximum proportion of busy channels of the AP. For an AP, if a proportion of busy channels exceeds a maximum proportion, the user equipment stops sending the uplink data for the at least one service through the AP; or for an AP, if a proportion of busy channels does not exceed a maximum proportion, the uplink data for the at least one service continues to be sent through the AP. For example, the maximum proportion may be set to 90%. If the proportion of busy channels of the AP is greater than 90%, it indicates that the AP is overloaded, and the user equipment is to stop transmitting the uplink data through the AP; or if the proportion of busy channels of the AP is less than 90%, the uplink data for the at least one service continues to be sent through the AP.

When the transmission stop threshold is a maximum backhaul link capacity of the AP, the user equipment may request related information about backhaul from the AP through an Access Network Query Protocol (ANQP) mechanism of the Hotspot2.0 protocol. For example, when the maximum backhaul link capacity is 100 Mbps, and the user equipment learns, through the ANQP mechanism, that a current backhaul link capacity is 50 Mbps, that is, the current backhaul link capacity is less than the maximum backhaul link capacity, the user equipment considers continuing to send the uplink data through the AP. On the contrary, if a current backhaul link capacity is greater than or equal to 100 Mbps, the user equipment considers stopping sending the uplink data through the AP.

When the transmission stop threshold is a maximum collision probability of contending for a channel by the user equipment, the user equipment collects statistics about a collision probability of contending for a channel by the user equipment. If the collision probability obtained by means of statistics collection exceeds the maximum collision probability, the user equipment stops sending the uplink data through the AP; or if the collision probability obtained by means of statistics collection does not exceed the maximum collision probability, the uplink data continues to be sent through the AP. Generally, user equipment sends data in a basic transmission manner or in a four-way handshake manner. When the basic transmission manner is used, the user equipment directly sends data to an AP, and the AP returns an acknowledge (ACK). In this case, if the user equipment does not receive, within a given time after sending the data, the ACK fed back by the AP, and the user equipment learns by means of measurement that a channel condition between the user equipment and the AP is poorer than a specific condition, it is considered that the channel condition is excessively poor and therefore the ACK is not received within the given time. Alternatively, if the user equipment does not receive, within a given time after sending the data, the ACK fed back by the AP, but on the contrary, if a channel condition is better than a specific condition, it may be considered that a collision occurs and therefore the ACK is not received, where a collision probability obtained by the user equipment by means of statistics collection is a ratio of a total quantity of times that a collision occurs to a total quantity of times that the user equipment attempts to send the data. When the four-way handshake manner is used, the user equipment sends request to send (RTS), an AP returns clear to send (CTS) to the user equipment, the user equipment sends data after receiving the CTS, and finally, the AP returns an ACK to the user equipment. In this process, if the user equipment does not receive, within a given time after sending the RTS, the CTS fed back by the AP, or the user equipment sends the data after receiving the CTS and does not receive, within a given time, the ACK fed back by the AP, in this case, if the user equipment learns by means of measurement that a channel condition between the user equipment and the AP is poorer than a specific condition, it is considered that the channel condition is excessively poor and therefore the ACK is not received within the given time. On the contrary, if a channel condition is better than a specific condition, it is considered that a collision occurs and therefore the ACK/CTS is not received, where a collision probability sensed by the user equipment is a ratio of a total quantity of times that a collision occurs to a total quantity of times that the user equipment attempts to send the data.

When the transmission stop threshold is a maximum packet error rate of receiving a data packet by the user equipment, when receiving downlink data, the user equipment collects statistics about a packet error rate of receiving a data packet. If the packet error rate obtained by means of statistics collection exceeds a maximum packet error rate, the user equipment stops sending the uplink data through the AP; or if the packet error rate obtained by means of statistics collection does not exceed a maximum packet error rate, the uplink data continues to be sent through the AP. The packet error rate of receiving a data packet is a ratio of a quantity of times of failing to depacketize a downlink data packet received by the user equipment to a total quantity of times of receiving a data packet.

When the transmission stop threshold is a strength threshold for a signal that the user equipment receives from the eNB, reference signal received power (RSRP) is used as an example, and when a preset threshold is −80 dBm, if RSRP of a signal that the user equipment receives from the eNB is −85 dBm, it is considered that the uplink data may continue to be sent through the AP; on the contrary, if RSRP of a signal that the user equipment receives from the eNB is −75 dBm, it is considered that sending of the uplink data through the AP is to be stopped. Except the RSRP, strength of a signal that the user equipment receives from the eNB may also be represented by reference signal received quality (RSRQ), received signal code power (RSCP), or the like.

When the transmission stop threshold is a strength threshold for a signal that the user equipment receives from the AP, a received signal strength indicator (RSSI) is used as an example, it is assumed that a preset threshold is −80 dBm, and when an RSSI of a signal that the user equipment receives from the AP is −85 dBm, it is considered that sending of the uplink data through the AP is to be stopped; on the contrary, when an RSSI of a signal that the user equipment receives from the AP is −75 dBm, it is considered that the uplink data may continue to be sent through the AP.

Except the RSSI, strength of a signal that the user equipment receives from the AP may also be represented by a received signal to noise indicator (RSNI), a received channel power indicator (RCPI), or the like.

Optionally, in the foregoing Embodiment 3, after stopping transmitting the uplink data for the at least one service through the AP, the user equipment further receives information about a threshold for permitting transmission sent by the base station. Then, the user equipment determines, according to the information about a threshold for permitting transmission, whether the uplink data for the at least one service is to be transmitted through the AP. If the user equipment determines that the uplink data for the at least one service is to be transmitted through the AP, the uplink data for the at least one service is transmitted through the AP.

Specifically, for example, the information about a threshold for permitting transmission may be a preset threshold that is of a performance condition of the user equipment, the AP, and/or the like and for triggering the user equipment to continue to transmit the uplink data through the AP, after the user equipment stops transmitting the uplink data through the AP. In this case, if the user equipment determines that the performance condition of the user equipment and/or the AP and the preset threshold meet a preset rule, the user equipment starts to transmit the uplink data through the AP; or if the user equipment determines that the performance condition of the user equipment and/or the AP and the preset threshold do not meet a preset rule, the user equipment stops transmitting the uplink data through the AP. For example, if the proportion of busy channels of the AP in the received beacon frame is less than a maximum proportion that is of busy channels of the AP and indicated by the information about a threshold for permitting transmission, after stopping transmitting the uplink data through the AP, the user equipment starts to send the uplink data for the at least one service through the AP. For another example, the user equipment determines that strength of a signal received from the eNB is less than a preset threshold indicated by the information about a threshold for permitting transmission, and therefore starts to send the uplink data for the at least one service through the AP.

Optionally, in the foregoing Embodiment 3, the information about a threshold for stopping transmission may carry service identifier information, where the service identifier information is configured to indicate the at least one service. In this case, the user equipment receives the information about a threshold for stopping transmission that includes the service identifier information and that is sent by the base station, and determines, according to the information about a threshold for stopping transmission, whether transmission, through the AP, of uplink data corresponding to the service identifier information is to be stopped. For a related description of the service identifier information, refer to the foregoing Embodiment 1 in FIG. 1, and details are not described herein.

Likewise, in the foregoing Embodiment 3, optionally, the information about a threshold for permitting transmission may also carry service identifier information, where the service identifier information is configured to indicate the at least one service. In this case, the user equipment that has stopped transmitting the uplink data through the AP determines, according to the information about a threshold for permitting transmission, whether to start to transmit, through the AP, uplink data corresponding to the service identifier information.

Optionally, in the foregoing Embodiment 3, if the user equipment stops transmitting the uplink data for the at least one service through the AP, the uplink data for the at least one service is transmitted through a cellular network. That is, for the uplink data for the at least one service stopped from being transmitted through the AP, the user equipment may choose not to transmit the uplink data, or transmit the uplink data to a core network through the cellular network, and the present invention is not limited thereto.

Figure 4:
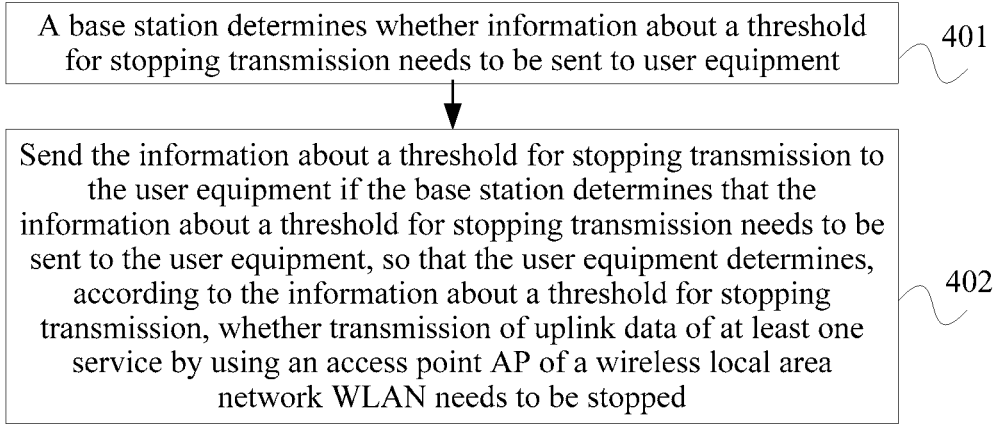
FIG. 4 is a flowchart of Embodiment 4 of a data transmission method according to the present invention.

FIG. 4 is a flowchart of Embodiment 4 of a data transmission method according to the present invention. This embodiment of the present invention describes the present invention in detail from a perspective of a base station, and this embodiment of the present invention is applicable to a scenario in which a cellular network and a WLAN network converge with each other and a data volume of uplink data in the WLAN is to be reduced to decrease a probability that an uplink data collision occurs in the WLAN. Compared with the foregoing Embodiment 2 in which a base station sends indication information for stopping transmission to user equipment so that the user equipment passively stops transmitting uplink data for a service through an AP, in this embodiment, a base station sends information about a threshold for stopping transmission to user equipment, and the user equipment actively determines whether transmission of uplink data through an AP is to be stopped. Specifically, this embodiment includes the following steps:

401. A base station determines whether information about a threshold for stopping transmission is to be sent to user equipment.

The base station determines, according to a performance condition of the base station, a performance condition of an AP, or a performance condition of the UE, whether the information about a threshold for stopping transmission is to be sent to the user equipment. For example, if uplink load of the base station is relatively light or load of an AP is relatively heavy, the base station considers that the information about a threshold for stopping transmission is to be sent to the user equipment, so that the user equipment determines, according to the threshold information, whether to stop transmitting uplink data for at least one service through the AP. For example, the information about a threshold for stopping transmission may be a performance condition of the AP, a performance condition of the UE, or a performance condition of the base station.

It should be noted that, the information about a threshold for stopping transmission may be generated by the base station and sent to the user equipment, or may be forwarded to the user equipment after the base station receives the information about a threshold for stopping transmission sent by an access network discovery and selection function ANDSF server, and the present invention is not limited thereto.

402. Send the information about a threshold for stopping transmission to the user equipment if the base station determines that the information about a threshold for stopping transmission is to be sent to the user equipment, so that the user equipment determines, according to the information about a threshold for stopping transmission, whether transmission of uplink data of at least one service by through an access point AP of a wireless local area network WLAN is to be stopped.

The base station sends the information about a threshold for stopping transmission to the user equipment after determining that the information about a threshold for stopping transmission is to be sent to the user equipment, so that the user equipment actively determines, according to the information about a threshold for stopping transmission, whether the transmission of the uplink data through the AP is to be stopped.

In the uplink data transmission method provided by this embodiment of the present invention, a base station sends information about a threshold for stopping transmission to user equipment after determining that the information about a threshold for stopping transmission is to be sent to the user equipment, so that the user equipment actively determines, according to the information about a threshold for stopping transmission, whether transmission of uplink data through an AP is to be stopped. If the user equipment determines that transmission of uplink data of at least one service through the AP is to be stopped, the user equipment stops transmitting the uplink data for the at least one service through the AP. In this process, the user equipment reduces a data volume of uplink data transmitted through a WLAN, so as to decrease a probability that an uplink data collision occurs in the WLAN, thereby improving service quality.

Optionally, in the foregoing Embodiment 4, for example, the information about a threshold for stopping transmission may be a maximum threshold of a performance condition of the user equipment, the AP, and/or the like when the user equipment is to stop transmitting the uplink data through the AP. In this case, if the user equipment determines that the performance condition of the user equipment and/or the AP exceeds the maximum threshold, the user equipment stops transmitting the uplink data through the AP; or if the user equipment determines that the performance condition of the user equipment and/or the AP does not exceed the maximum threshold, the user equipment continues to transmit the uplink data through the AP. For details, reference may be made to the foregoing Embodiment 3, and details are not described herein.

Optionally, in the foregoing Embodiment 4, if the base station determines that the information about a threshold for stopping transmission is to be sent to the user equipment, the base station further sends information about a threshold for permitting transmission to the user equipment after sending the information about a threshold for stopping transmission to the user equipment, so that the user equipment that has stopped transmitting the uplink data through the AP determines, according to the information about a threshold for permitting transmission, whether transmission of the uplink data for the at least one service through the AP is to be started, and transmits, through the AP, the uplink data for the at least one service if the user equipment determines that the uplink data for the at least one service is to be transmitted through the AP.

Optionally, in the foregoing Embodiment 4, the information about a threshold for stopping transmission may carry service identifier information, where the service identifier information is configured to indicate the at least one service. In this case, the user equipment receives the information about a threshold for stopping transmission that includes the service identifier information and that is sent by the base station, and determines, according to the information about a threshold for stopping transmission, whether transmission, through the AP, of uplink data corresponding to the service identifier information is to be stopped. For a related description of the service identifier information, refer to the foregoing Embodiment 1 in FIG. 1, and details are not described herein.

Likewise, the information about a threshold for permitting transmission may also carry service identifier information, where the service identifier information is configured to indicate the at least one service. In this case, the user equipment that has stopped transmitting the uplink data through the AP determines, according to the information about a threshold for permitting transmission, whether to start to transmit, through the AP, uplink data corresponding to the service identifier information.

Optionally, in the foregoing Embodiment 4, if the base station determines that the information about a threshold for stopping transmission is to be sent to the user equipment, the base station further receives, after sending the information about a threshold for stopping transmission to the user equipment, the uplink data for the at least one service transmitted by the user equipment.

Figure 5:
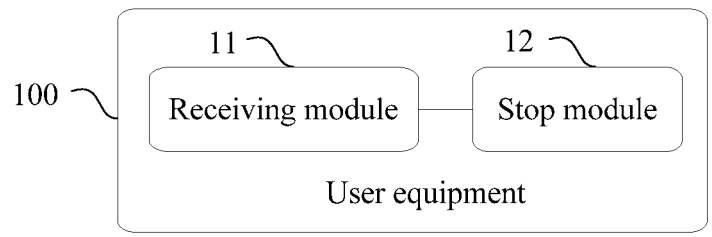
FIG. 5 is a schematic structural diagram of Embodiment 1 of user equipment according to the present invention.

FIG. 5 is a schematic structural diagram of Embodiment 1 of user equipment according to the present invention. The user equipment provided by this embodiment is an apparatus embodiment corresponding to the embodiment in FIG. 1 of the present invention, and a specific implementation process is not described herein. Specifically, user equipment 100 provided by this embodiment includes a receiving module 11 and a stop module 12. The receiving module 11 is configured to receive indication information for stopping transmission sent by a base station, where the indication information for stopping transmission is configured to instruct the user equipment to stop transmitting uplink data for at least one service by through an access point AP of a wireless local area network WLAN. The stop module 12 is configured to stop, according to the indication information for stopping transmission received by the receiving module 11, transmission of the uplink data for the at least one service through the AP.

After receiving indication information for stopping transmission sent by a base station, the user equipment provided by this embodiment of the present invention stops transmitting uplink data for at least one service through an AP, so that uplink data that is to be transmitted through a WLAN is reduced. In this process, the user equipment reduces a data volume of uplink data transmitted through the WLAN, so as to decrease a probability that an uplink data collision occurs in the WLAN, thereby improving service quality.

Figure 6:
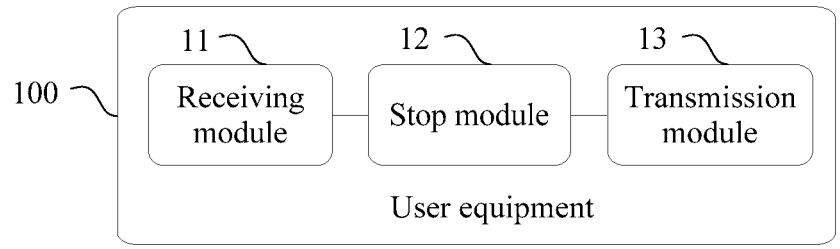
FIG. 6 is a schematic structural diagram of Embodiment 2 of user equipment according to the present invention.

FIG. 6 is a schematic structural diagram of Embodiment 2 of user equipment according to the present invention. As shown in FIG. 6, based on the structure in FIG. 5, the user equipment 100 in this embodiment further includes: a transmission module 13. In this embodiment, the receiving module 11 is further configured to: after receiving the indication information for stopping transmission sent by the base station, receive indication information for permitting transmission sent by the base station, where the indication information for permitting transmission is configured to instruct the user equipment to transmit the uplink data for the at least one service through the AP. In this embodiment, the transmission module 13 is configured to transmit, according to the indication information for permitting transmission received by the receiving module 11, the uplink data for the at least one service through the AP.

Optionally, in an embodiment of the present invention, the indication information for stopping transmission includes service identifier information, where the service identifier information is configured to indicate the at least one service; and the stop module 12 is specifically configured to stop, according to the indication information for stopping transmission, the transmission, through the AP, of the uplink data for the at least one service indicated by the service identifier information.

Optionally, in an embodiment of the present invention, the indication information for permitting transmission includes service identifier information, where the service identifier information is configured to indicate the at least one service; the receiving module 11 is specifically configured to receive the indication information for permitting transmission that includes the service identifier information and that is sent by the base station; and the transmission module 13 is specifically configured to transmit, through the AP and according to the indication information for permitting transmission received by the receiving module 11, the uplink data for the at least one service indicated by the service identifier information.

Optionally, in an embodiment of the present invention, the transmission module 13 is further configured to transmit the uplink data for the at least one service through a cellular network.

Figure 7:
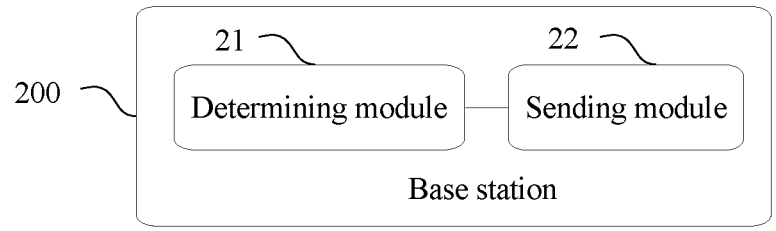
FIG. 7 is a schematic structural diagram of Embodiment 1 of a base station according to the present invention.

FIG. 7 is a schematic structural diagram of Embodiment 1 of a base station according to the present invention. The base station provided by this embodiment is an apparatus embodiment corresponding to the embodiment in FIG. 2 of the present invention, and a specific implementation process is not described herein. Specifically, a base station 200 provided by this embodiment includes a determining module 21, and a sending module 22. The determining module 21 can be configured to determine whether user equipment is to stop transmitting uplink data for at least one service through an AP of a wireless local area network WLAN. The sending module 22 can be configured to send indication information for stopping transmission to the user equipment if the determining module 21 determines that the user equipment is to stop transmitting the uplink data for the at least one service through the AP, where the indication information for stopping transmission is configured to instruct the user equipment to stop transmitting the uplink data for the at least one service through the AP.

When determining that user equipment is to stop transmitting uplink data for at least one service through an AP, the base station provided by this embodiment of the present invention sends, to the user equipment, indication information for stopping transmission, which is configured to instruct to stop transmitting the uplink data for the at least one service through the AP, so that uplink data that is to be transmitted through a WLAN is reduced. In this process, a data volume of uplink data transmitted through the WLAN is reduced to decrease a probability that an uplink data collision occurs in the WLAN, thereby improving service quality.

Optionally, in an embodiment of the present invention, the determining module 21 is further configured to: after the sending module 22 sends the indication information for stopping transmission to the user equipment, determine whether the user equipment is to transmit the uplink data for the at least one service through the AP. In that embodiment, the sending module 22 is further configured to send indication information for permitting transmission to the user equipment if the base station determines that the user equipment is to transmit the uplink data for the at least one service through the AP, where the indication information for permitting transmission is configured to instruct the user equipment to transmit the uplink data for the at least one service through the AP.

Optionally, in an embodiment of the present invention, the indication information for stopping transmission includes service identifier information, where the service identifier information is configured to indicate the at least one service.

Optionally, in an embodiment of the present invention, the indication information for permitting transmission includes service identifier information, where the service identifier information is configured to indicate the at least one service.

Figure 8:
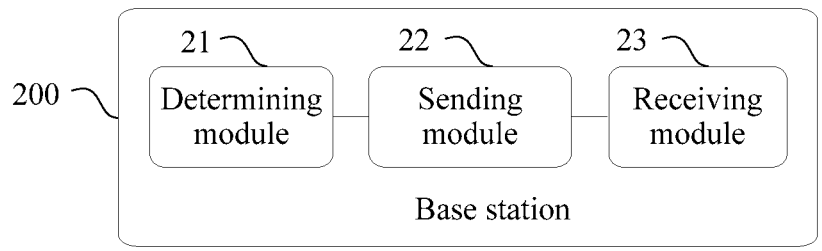
FIG. 8 is a schematic structural diagram of Embodiment 2 of a base station according to the present invention.

FIG. 8 is a schematic structural diagram of Embodiment 2 of a base station according to the present invention. As shown in FIG. 8, based on the structure in FIG. 7, the base station 200 in this embodiment further includes a receiving module 23, configured to: after the sending module 22 sends the indication information for stopping transmission, receive the uplink data for the at least one service transmitted by the user equipment.

Figure 9:
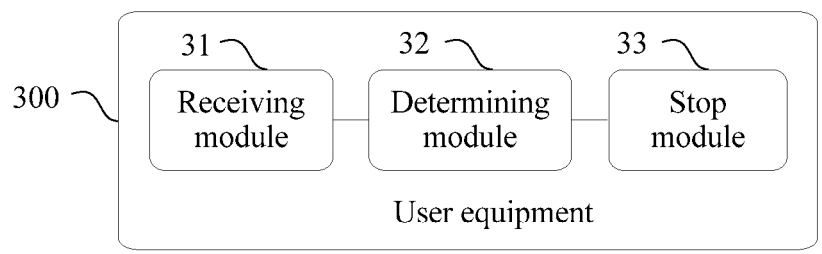
FIG. 9 is a schematic structural diagram of Embodiment 3 of user equipment according to the present invention.

FIG. 9 is a schematic structural diagram of Embodiment 3 of user equipment according to the present invention. The user equipment provided by this embodiment is an apparatus embodiment corresponding to the embodiment in FIG. 3 of the present invention, and a specific implementation process is not described herein. Specifically, user equipment 300 provided by this embodiment includes a receiving module 31, a determining module 32, and a stop module 33. The receiving module 31 can be configured to receive information about a threshold for stopping transmission sent by a base station. The determining module 32 can be configured to determine, according to the information about a threshold for stopping transmission received by the receiving module 31, whether transmission of uplink data of at least one service by through an access point AP of a wireless local area network WLAN is to be stopped. The stop module 33 can be configured to: if the determining module 32 determines that the transmission of the uplink data for the at least one service through the AP is to be stopped, stop transmitting the uplink data for the at least one service through the AP.

After receiving information about a threshold for stopping transmission sent by a base station, the user equipment provided by this embodiment of the present invention actively determines, according to the information about a threshold for stopping transmission, whether transmission of uplink data of at least one service through an AP is to be stopped. If the user equipment determines that the transmission of the uplink data for the at least one service through the AP is to be stopped, the user equipment stops transmitting the uplink data for the at least one service through the AP. In this process, the user equipment reduces a data volume of uplink data transmitted through a WLAN, so as to decrease a probability that an uplink data collision occurs in the WLAN, thereby improving service quality.

Figure 10:
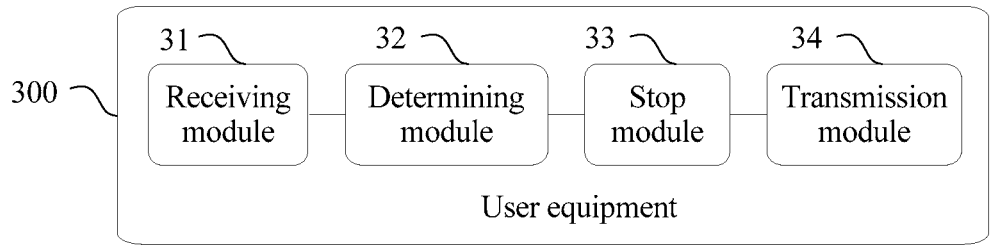
FIG. 10 is a schematic structural diagram of Embodiment 4 of user equipment according to the present invention.

FIG. 10 is a schematic structural diagram of Embodiment 4 of user equipment according to the present invention. As shown in FIG. 10, based on the structure in FIG. 9, the user equipment 300 in this embodiment further includes: a transmission module 34. In that embodiment, the receiving module 31 is further configured to: after the stop module 33 stops transmitting the uplink data for the at least one service through the AP, receive information about a threshold for permitting transmission sent by the base station. In that embodiment, the determining module 32 is further configured to determine, according to the information about a threshold for permitting transmission received by the receiving module 31, whether the uplink data for the at least one service is to be transmitted through the AP. Still in that embodiment, the transmission module 34 is configured to: if the determining module 32 determines that the uplink data for the at least one service is to be transmitted through the AP, transmit the uplink data for the at least one service through the AP.

Optionally, in an embodiment of the present invention, the information about a threshold for stopping transmission includes service identifier information, where the service identifier information is configured to indicate the at least one service.

Optionally, in an embodiment of the present invention, the information about a threshold for permitting transmission includes service identifier information, where the service identifier information is configured to indicate the at least one service.

Optionally, in an embodiment of the present invention, the transmission module 34 is further configured to: after the stop module 33 stops transmitting the uplink data for the at least one service through the AP, transmit the uplink data for the at least one service through a cellular network.

Figure 11:
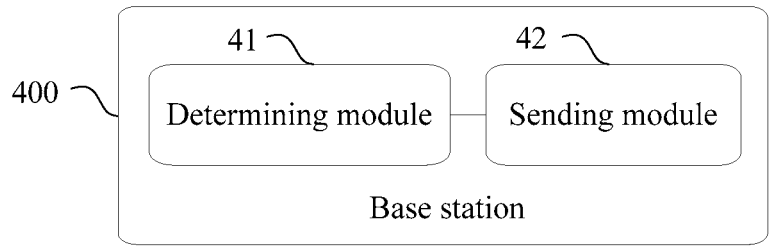
FIG. 11 is a schematic structural diagram of Embodiment 3 of a base station according to the present invention.

FIG. 11 is a schematic structural diagram of Embodiment 3 of a base station according to the present invention. The base station provided by this embodiment is an apparatus embodiment corresponding to the embodiment in FIG. 4 of the present invention, and a specific implementation process is not described herein. Specifically, a base station 400 provided by this embodiment includes a determining module 41, and a sending module 42. The determining module 41 can be configured to determine whether information about a threshold for stopping transmission is to be sent to user equipment. The sending module 42 can be configured to send the information about a threshold for stopping transmission to the user equipment if the determining module 41 determines that the information about a threshold for stopping transmission is to be sent to the user equipment, so that the user equipment determines, according to the information about a threshold for stopping transmission, whether transmission of uplink data of at least one service by through an access point AP of a wireless local area network WLAN is to be stopped.

The base station provided by this embodiment of the present invention sends information about a threshold for stopping transmission to user equipment after determining that the information about a threshold for stopping transmission is to be sent to the user equipment, so that the user equipment actively determines, according to the information about a threshold for stopping transmission, whether transmission of uplink data through an AP is to be stopped. If the user equipment determines that transmission of uplink data of at least one service through the AP is to be stopped, the user equipment stops transmitting the uplink data for the at least one service through the AP. In this process, the user equipment reduces a data volume of uplink data transmitted through a WLAN, so as to decrease a probability that an uplink data collision occurs in the WLAN, thereby improving service quality.

Optionally, in an embodiment of the present invention, the sending module 42 is further configured to send information about a threshold for permitting transmission to the user equipment after sending the information about a threshold for stopping transmission.

Optionally, in an embodiment of the present invention, the information about a threshold for stopping transmission includes service identifier information, where the service identifier information is configured to indicate the at least one service.

Optionally, in an embodiment of the present invention, the information about a threshold for permitting transmission includes service identifier information, where the service identifier information is configured to indicate the at least one service.

Figure 12:
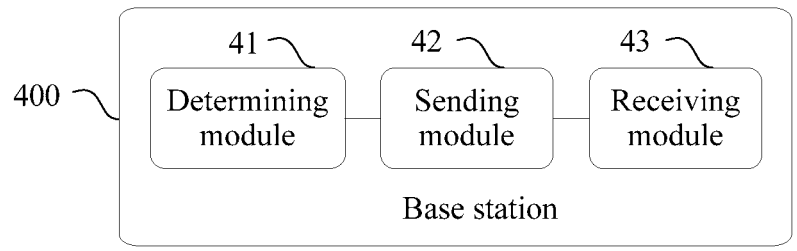
FIG. 12 is a schematic structural diagram of Embodiment 4 of a base station according to the present invention.

FIG. 12 is a schematic structural diagram of Embodiment 4 of a base station according to the present invention. As shown in FIG. 12, based on the structure in FIG. 11, the base station 400 in this embodiment further includes a receiving module 43, configured to: after the sending module 42 sends the information about a threshold for stopping transmission to the user equipment, receive the uplink data for the at least one service transmitted by the user equipment.

Figure 13:
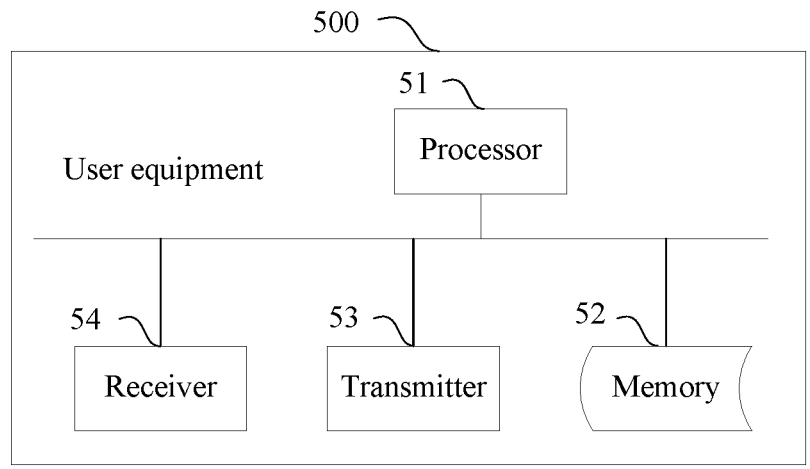
FIG. 13 is a schematic structural diagram of Embodiment 5 of user equipment according to the present invention.

FIG. 13 is a schematic structural diagram of Embodiment 5 of user equipment according to the present invention. As shown in FIG. 13, user equipment 500 provided by this embodiment includes a processor 51 and a memory 52. The user equipment 500 may further include a transmitter 53 and a receiver 54. The transmitter 53 and the receiver 54 may be connected to the processor 51. The transmitter 53 is configured to send data or information. The receiver 54 is configured to receive data or information. The memory 52 stores an execution instruction. When the user equipment 500 runs, the processor 51 communicates with the memory 52. The processor 51 invokes the execution instruction in the memory 52 to execute the method embodiment shown in FIG. 1; the implementation principles and technical effects thereof are similar, and details are not described herein.

Figure 14:
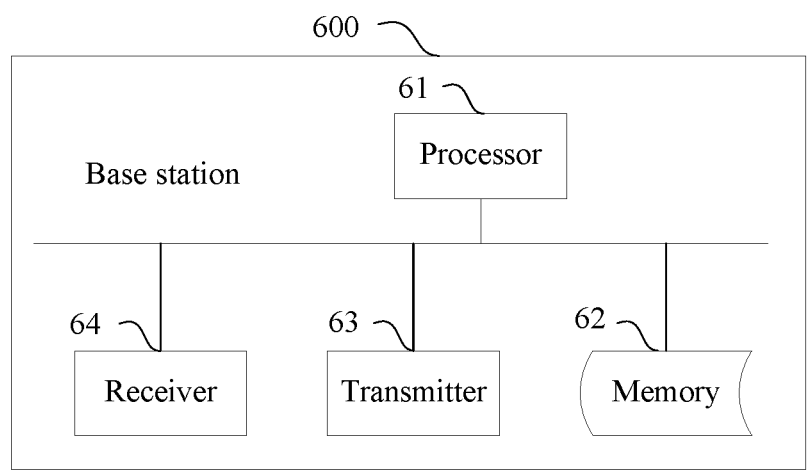
FIG. 14 is a schematic structural diagram of Embodiment 5 of a base station according to the present invention.

FIG. 14 is a schematic structural diagram of Embodiment 5 of a base station according to the present invention. As shown in FIG. 14, a base station 600 provided by this embodiment includes a processor 61 and a memory 62. The base station 600 may further include a transmitter 63 and a receiver 64. The transmitter 63 and the receiver 64 may be connected to the processor 61. The transmitter 63 is configured to send data or information. The receiver 64 is configured to receive data or information. The memory 62 stores an execution instruction. When the base station 600 runs, the processor 61 communicates with the memory 62. The processor 61 invokes the execution instruction in the memory 62 to execute the method embodiment shown in FIG. 2; the implementation principles and technical effects thereof are similar, and details are not described herein.

Figure 15:
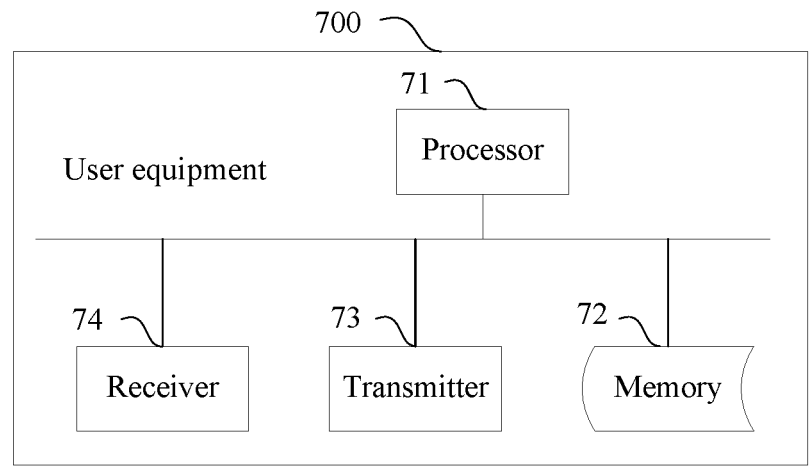
FIG. 15 is a schematic structural diagram of Embodiment 6 of user equipment according to the present invention.

FIG. 15 is a schematic structural diagram of Embodiment 6 of user equipment according to the present invention. As shown in FIG. 15, user equipment 700 provided by this embodiment includes a processor 71 and a memory 72. The user equipment 700 may further include a transmitter 73 and a receiver 74. The transmitter 73 and the receiver 74 may be connected to the processor 71. The transmitter 73 is configured to send data or information. The receiver 74 is configured to receive data or information. The memory 72 stores an execution instruction. When the user equipment 700 runs, the processor 71 communicates with the memory 72. The processor 71 invokes the execution instruction in the memory 72 to execute the method embodiment shown in FIG. 3; the implementation principles and technical effects thereof are similar, and details are not described herein.

Figure 16:
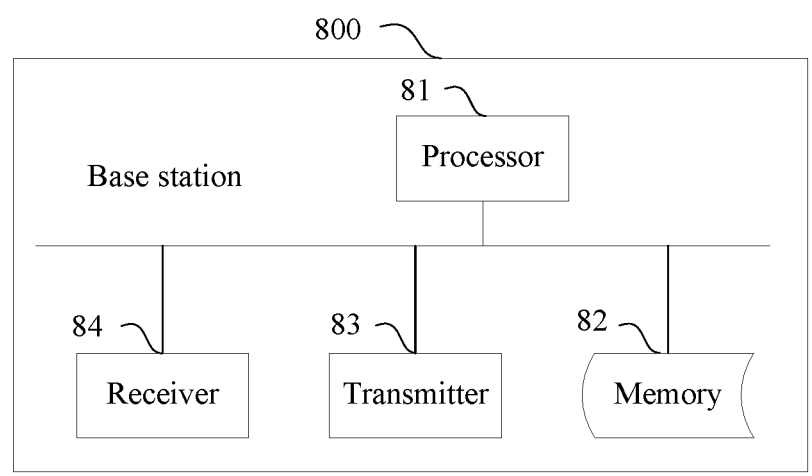
FIG. 16 is a schematic structural diagram of Embodiment 6 of a base station according to the present invention.

FIG. 16 is a schematic structural diagram of Embodiment 6 of a base station according to the present invention. As shown in FIG. 16, a base station 800 provided by this embodiment includes a processor 81 and a memory 82. The base station 800 may further include a transmitter 83 and a receiver 84. The transmitter 83 and the receiver 84 may be connected to the processor 81. The transmitter 83 is configured to send data or information. The receiver 84 is configured to receive data or information. The memory 82 stores an execution instruction. When the base station 800 runs, the processor 81 communicates with the memory 82. The processor 81 invokes the execution instruction in the memory 82 to execute the method embodiment shown in FIG. 4; the implementation principles and technical effects thereof are similar, and details are not described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An uplink data transmission method, comprising:
   transmitting, by a user equipment, uplink data for at least one service through an access point (AP) of a wireless local area network (WLAN), wherein the at least one service includes a first service;
   receiving, from a base station, by the user equipment, indication information for stopping transmitting the uplink data for the first service through the AP of the WLAN, wherein the indication information for stopping transmitting includes a bearer identifier identifying the first service, and wherein the indication information for stopping transmitting is generated by the base station in response to an actual load of the AP exceeds a threshold load; and
   stopping, by the user equipment according to the bearer identifier, transmitting the uplink data for the first service through the AP.

2. The method according to claim 1, after the receiving from the base station, by the user equipment, indication information for stopping transmission, the method further comprising:
   receiving from the base station, by the user equipment, indication information for permitting transmission, wherein the indication information for permitting transmission is configured to instruct the user equipment to transmit the uplink data for the first service through the AP; and
   transmitting, by the user equipment according to the indication information for permitting transmission, the uplink data for the first service through the AP.

3. The method according to claim 2, wherein the indication information for permitting transmission includes the bearer identifier; and, wherein
   receiving, by the user equipment, indication information for permitting transmission from the base station comprises:
   receiving, by the user equipment, the indication information for permitting transmission that includes the bearer identifier; and
   the transmitting, by the user equipment according to the indication information for permitting transmission, the uplink data for the first service through the AP comprises:
   transmitting, by the user equipment through the AP and according to the indication information for permitting transmission, the uplink data for the first service indicated by the bearer identifier.

4. The method according to claim 1, after the receiving, by the user equipment, indication information for stopping transmission, further comprising:
   transmitting, by the user equipment, the uplink data for the first service through a cellular network.

5. An uplink data transmission method, comprising:
   determining, by a base station, whether a user equipment is to stop transmitting uplink data for a first service through an access point (AP) of a wireless local area network (WLAN);
   generating, by the base station, indication information for stopping in response to an actual load of the AP exceeds a threshold load, wherein the indication information for stopping transmission is configured to instruct the user equipment to stop transmitting the uplink data for the first service through the AP, and the indication information for stopping transmitting includes a bearer identifier identifying the first service; and
   sending the indication information for stopping transmission to the user equipment when the base station determines that the user equipment is to stop transmitting the uplink data for the first service through the AP.

6. The method according to claim 5, after the sending, by the base station, indication information for stopping transmission to the user equipment, further comprising:
   determining, by the base station, whether the user equipment is to transmit the uplink data for the first service through the AP; and
   sending the indication information for permitting transmission to the user equipment when the base station determines that the user equipment is to transmit the uplink data for the first service through the AP, wherein the indication information for permitting transmission is configured to instruct the user equipment to transmit the uplink data for the first service through the AP.

7. The method according to claim 6, wherein the indication information for permitting transmission includes the bearer identifier.

8. The method according to claim 5, after the sending indication information for stopping transmission to the user equipment when the base station determines that the user equipment is to stop transmitting the uplink data for the first service through the AP, further comprising:
   receiving, by the base station, the uplink data for the first service from the user equipment.

9. The method according to claim 5, wherein determining, by a base station, whether user equipment is to stop transmitting uplink data for first service through a AP of a WLAN comprises:
   determining, according to a performance condition of the AP, a performance condition of the user equipment, or a performance condition of the base station, whether the user equipment is to stop transmitting the uplink data for the first service through the AP.

10. User equipment, comprising a processor and memory, wherein the memory stores instructions, the processor communicates with the memory when the user equipment runs, and the processor executes the instructions to cause the user equipment to perform:
    transmitting uplink data for at least one service through an access point (AP) of a wireless local area network (WLAN), wherein the at least one service includes a first service;
    receiving, from a base station, indication information for stopping transmitting the uplink data for the first service through the AP of the WLAN, wherein the indication information for stopping transmitting includes a bearer identifier identifying the first service, and wherein the indication information for stopping transmission is configured to instruct the user equipment to stop transmitting the uplink data for the first service through the AP, and the indication information for stopping transmitting includes a bearer identifier identifying the first service; and stopping according to the bearer identifier, transmitting the uplink data for the first service through the AP.

11. The user equipment according to claim 10, wherein after the receiving, from a base station, indication information for stopping transmission, the user equipment is further caused to perform:

receiving indication information for permitting transmission from the base station, wherein the indication information for permitting transmission is configured to instruct the user equipment to transmit the uplink data for the first service through the AP; and transmitting according to the indication information for permitting transmission, the uplink data for the first service through the AP.

12. The user equipment according to claim 10, wherein the indication information for permitting transmission includes the bearer identifier; and, wherein receiving indication information for permitting transmission form the base station comprises:

receiving the indication information for permitting transmission that includes the bearer identifier; and transmitting according to the indication information for permitting transmission, the uplink data for the first service through the AP comprises:

transmitting through the AP and according to the indication information for permitting transmission, the uplink data for the first service indicated by the bearer identifier.

13. The user equipment according to claim 10, after receiving indication information for stopping transmission form a base station, the user equipment is further caused to perform:

transmitting the uplink data for the first service through a cellular network.

* * * * *